United States Patent Office
2,936,864
Patented May 17, 1960

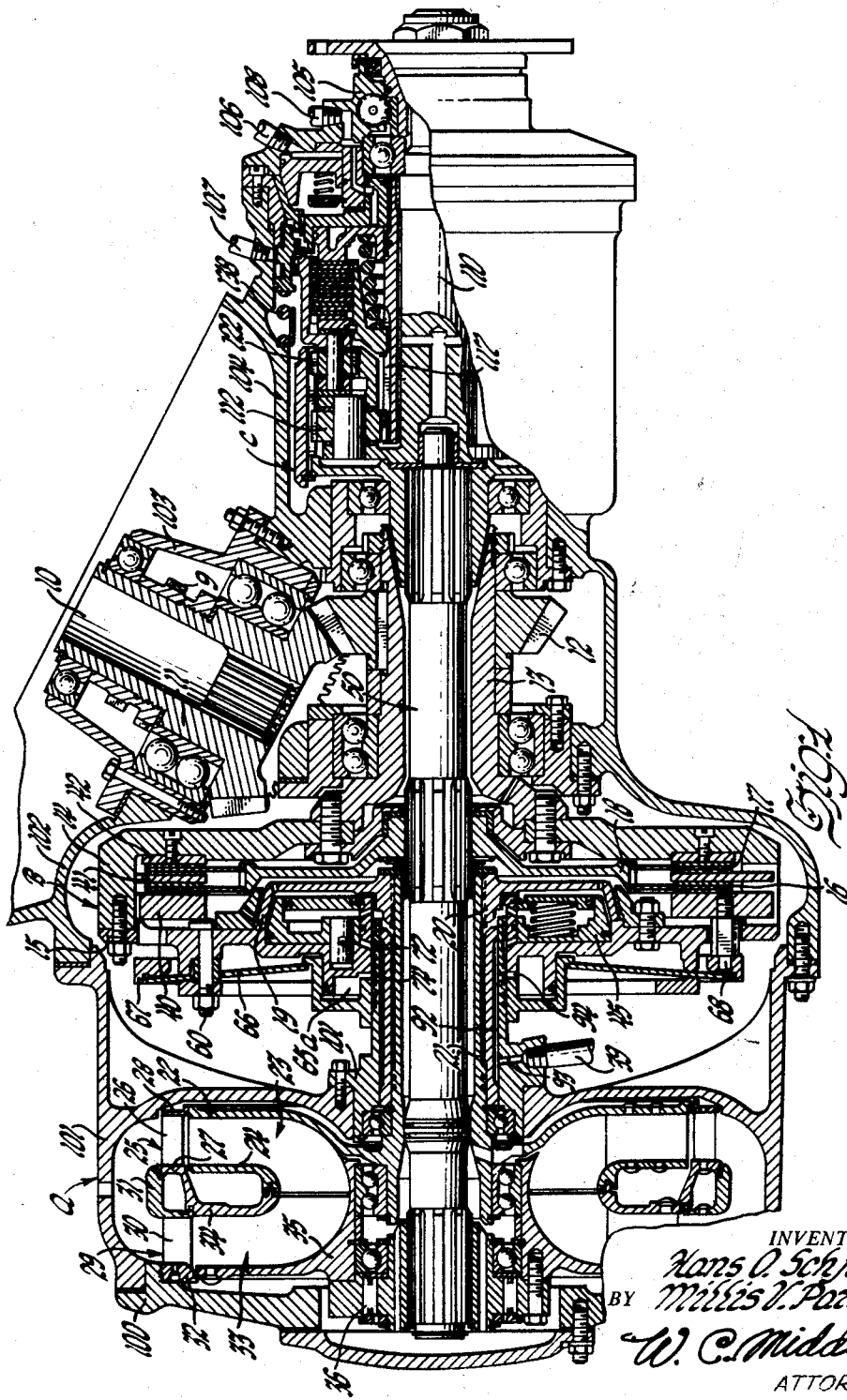

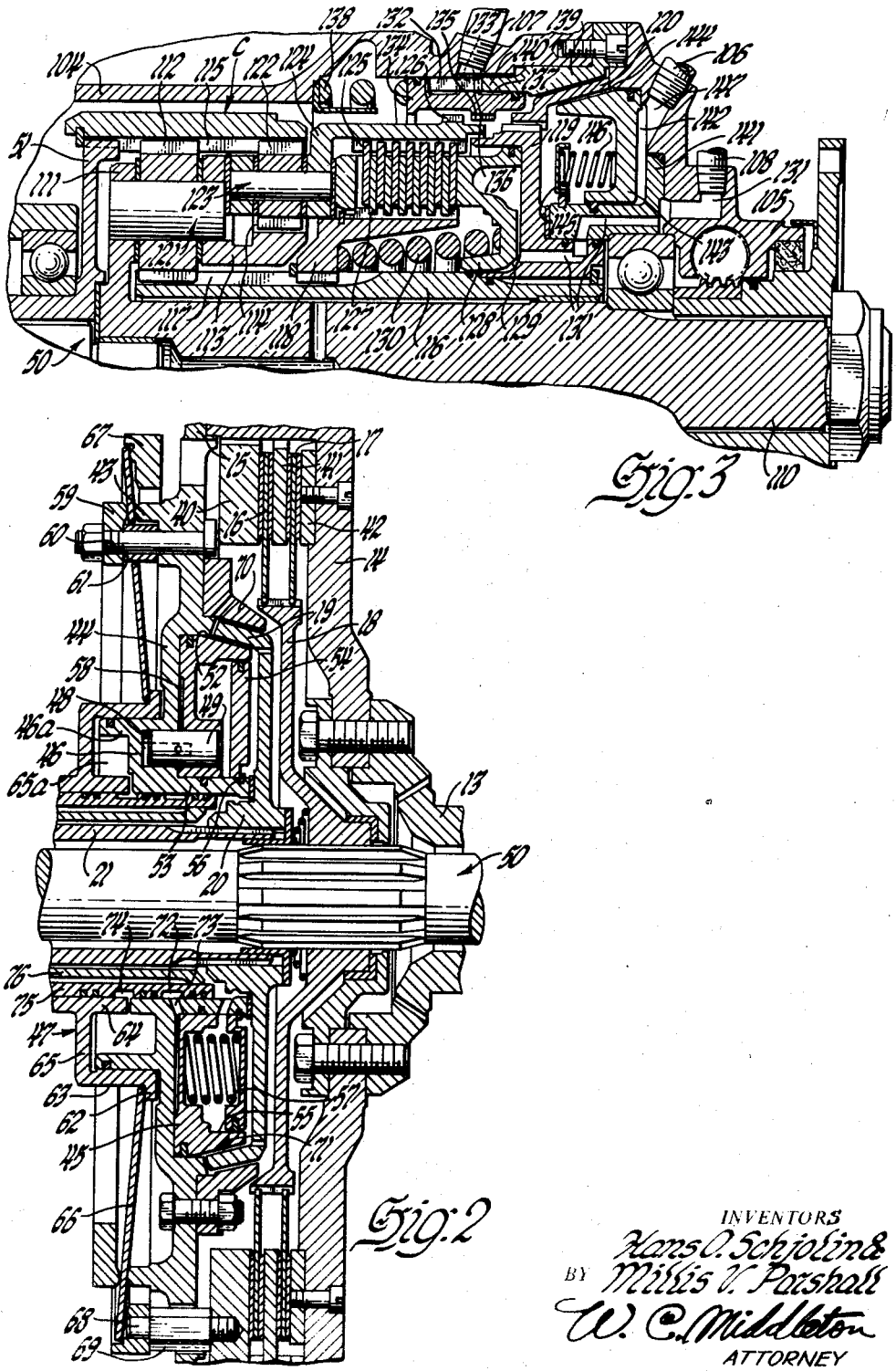

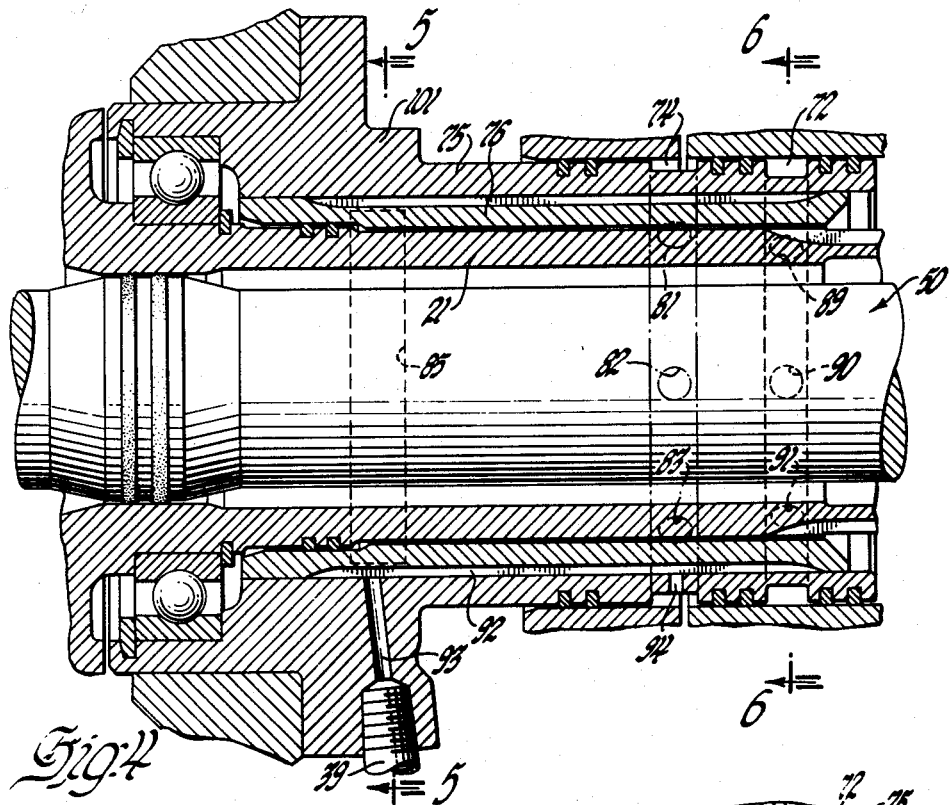
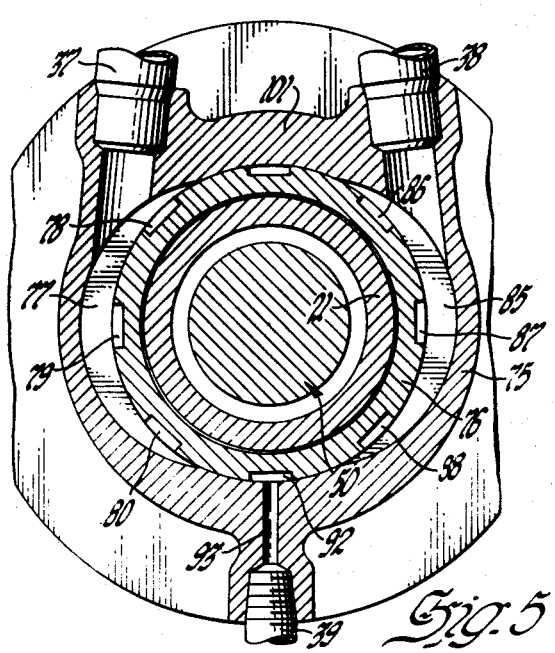
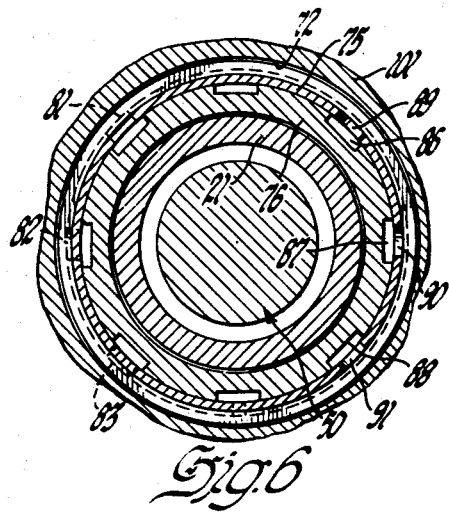

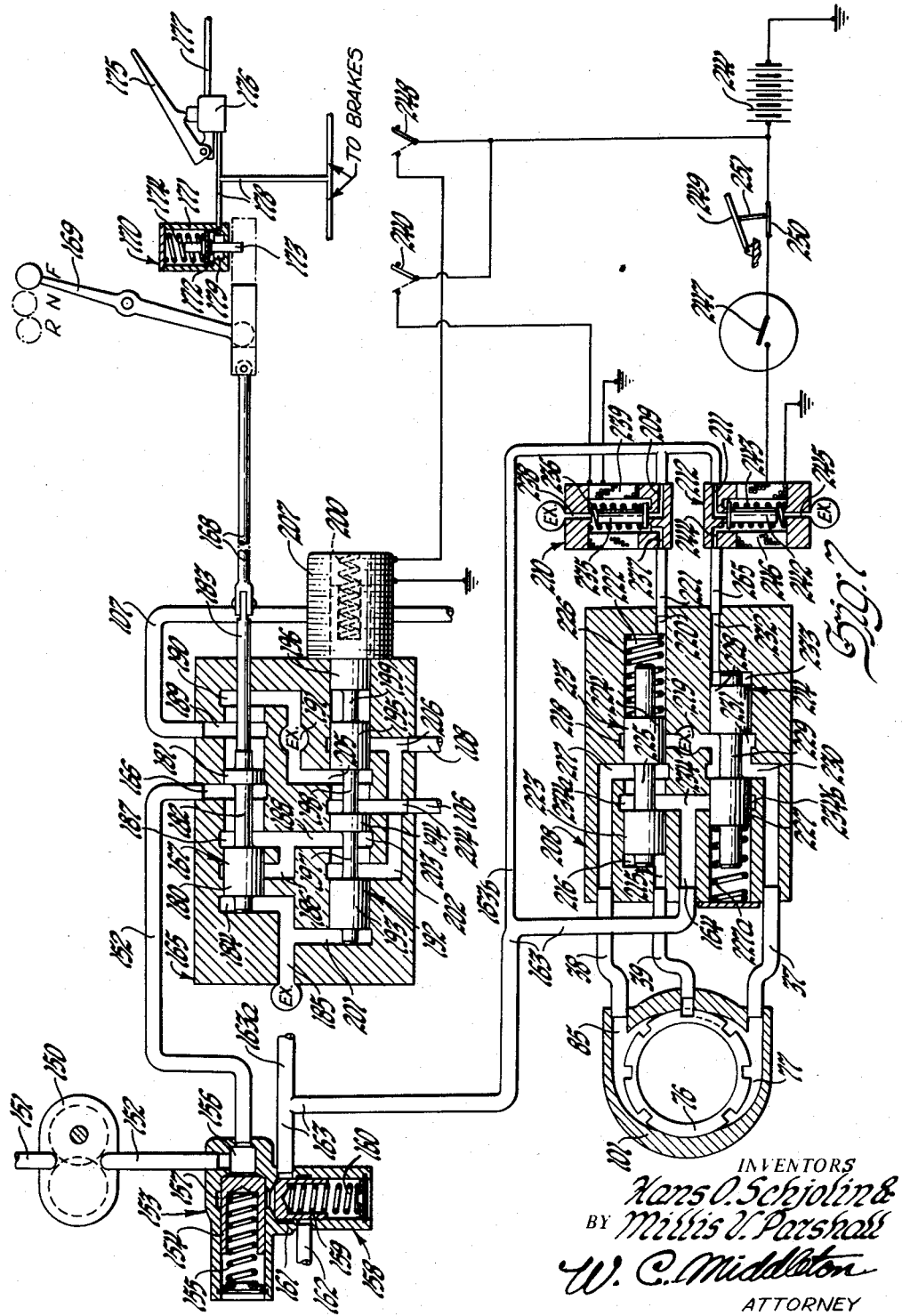

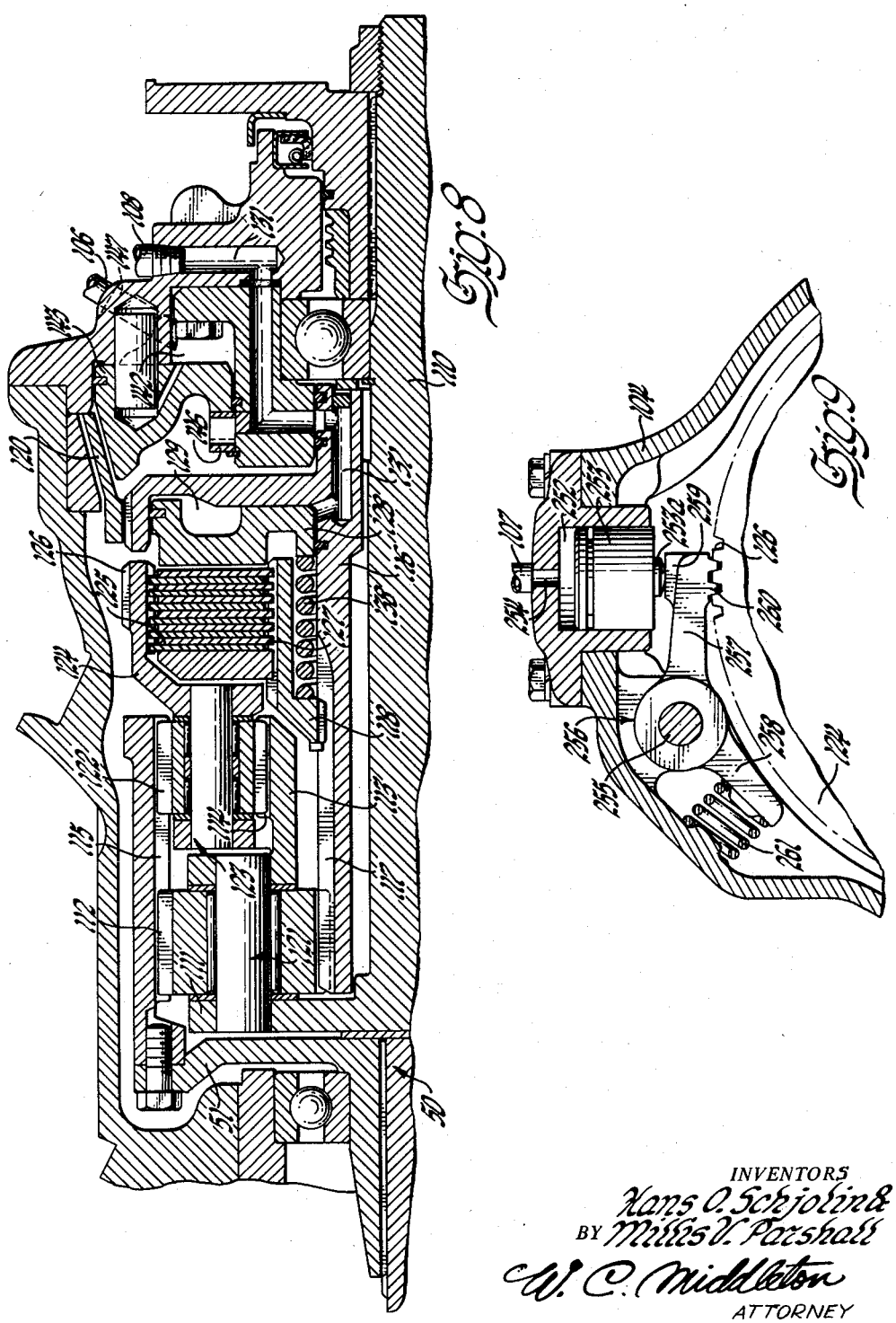

2,936,864

TRANSMISSION DRIVE MECHANISM FOR VEHICLES AND THE CONTROL SYSTEM THEREFOR

Hans O. Schjolin, Birmingham, and Millis V. Parshall, Pontiac, Mich., assignors to General Motors Corporation, Detroit, Mich., a corporation of Delaware Application June 21, 1956, Serial No. 592,794

21 Claims. (Cl. 192—.092)

The present invention relates to transmission drive mechanism for vehicles and the control system therefor, in which hydrodynamic fluid torque converter devices are incorporated for providing infinitely variable drive ratio changes with torque multiplication, and incorporating a direct drive clutch mechanism for direct drive to the transmission gearing unit without torque multiplication. The control system includes structural features departing from certain teachings in this art, as set forth in detail below.

An object of this invention is to provide a transmission structure including a clutch adapted to be engaged for torque multiplication drive through a torque converter and a second clutch adapted to be engaged for direct drive through the transmission without torque multiplication.

Another object of this invention is to provide in a transmission of the type described, a pair of clutch plates adapted to be actuated for direct drive to the transmission and a cone clutch adapted to be actuated for establishing hydrodynamic torque converter drive to the transmission.

A further object of this invention is to provide in a transmission of the type described, clutch means adapted to establish direct drive to a transmission and clutch means adapted to establish hydrodynamic torque converter drive to the transmission wherein the clutch means are positioned for rotation and wherein the clutch actuating servos for each clutch means is physically positioned radially inwardly of the clutch means actuated thereby and close to the axis of rotation of the clutch means.

Another object of this invention is to provide in a transmission of the type described a clutch driven assembly having a radially positioned flange or plate member forming a common reaction member for fluid pressure utilized to actuate servo members positioned on opposite sides of the plate member.

A further object of this invention is to provide a transmission structure of the type described including a clutch drum and servo assembly which is compact in space requirement and can quickly and easily be assembled and disassembled for maintenance and repair and which is economical to build and assemble in production.

Another object of this invention is to provide a control system for a transmission of the type described including a torque converter clutch drive servo and a direct drive clutch servo, and including valve means for delaying release of the converter drive servo until the direct drive clutch servo is fully applied.

An additional object of this invention is to provide a control system for a transmission of the class described including governor means automatically operative to shift from converter drive to direct drive when a predetermined vehicle speed is reached.

A further object of this invention is to provide a control system for a transmission of the type described including manually operable control means for engaging both the converter drive clutch and direct drive clutch simultaneously to provide hydrodynamic braking of the vehicle.

Yet another object of this invention is to provide manually operable control means for controlling the transmission drive ratio and operable to change the transmission drive ratio both in converter drive and direct drive.

Still another object of this invention is to provide means for preventing unintentional shift of the transmission into reverse drive co-ordinated with the vehicle brake pedal so that shift into reverse can be accomplished only when the vehicle brakes are applied.

A further object of this invention is to provide accelerator pedal controlled means for shifting from direct drive to converter drive without disturbing the drive ratio of the transmission gearing unit.

These and other objects of this invention will be apparent from the following specification and claims, taken in conjunction with the accompanying drawings in which:

Fig. 1 is a vertical section of a transmission constructed in accordance with the principles of this invention.

Fig. 2 is an enlarged sectional view of the clutch portion of Fig. 1.

Fig. 3 is an enlarged sectional view of the planetary gearing unit of Fig. 1.

Fig. 4 is an enlarged sectional view of a portion of Fig. 1 illustrating the sleeve arrangement for admitting control pressure to the clutch control servo chambers.

Fig. 5 is a sectional view taken along the line 5—5 of Fig. 4.

Fig. 6 is a sectional view taken along the line 6—6 of Fig. 4.

Fig. 7 is a schematic diagram of a control system which may be used in connection with the transmission arrangement of Fig. 1 or Figs. 8 and 9.

Fig. 8 is a vertical sectional view of a modified planetary gearing unit which may be substituted for the gearing unit shown in Fig. 3.

Fig. 9 is a vertical sectional view of a pawl and servo arrangement for use in the gearing unit illustrated in Fig. 8.

The transmission assembly shown in Fig. 1 is made up of a hydrodynamic torque converter unit A, a clutching unit B and a planetary gearing unit C. A power input shaft 10 is adapted to drive an intermediate shaft 50 through either the torque converter unit A or directly as hereafter explained. Intermediate shaft 50 may be connected to a final output or load shaft 110 for either reduction drive or direct drive by means of planetary gearing unit C. In addition, the planetary gearing unit may be controlled to provide either neutral or no drive to shaft 110 or to provide reverse drive of shaft 110.

An engine drive shaft 10 have a bevel gear 11 affixed thereto is adapted to drive a clutch drum 14 by means of a bevel gear 12 splined to a drive sleeve 13, the sleeve 13 being bolted to clutch drum 14. Detachably secured to drum 14 is a radially extending plate member 15. A pair of clutch plates 16 and 17 splined to a clutch hub 18 which in turn is splined to shaft 50 may be actuated to connect shaft 50 directly to engine shaft 10. A cone clutch 19 having its hub 20 splined to a sleeve 21 may be actuated to drive the impeller 22 of the hydrodynamic torque converter unit A. The torque converter impeller 22 carries blades 23 supported upon a ring member 24 and impeller 22. Located outwardly from impeller 22 is first-stage blading of a two stage turbine member 25, the blades 26 being supported upon ring members 27 and 28. A reaction member 29 is provided with blades 30 supported upon a ring 31 fixed to housing 100 and a ring 32. Second stage blading of the turbine member 25 consists of blades 33 supported upon a hub 35 and ring 34.

A one-way clutch 36 positioned between turbine hub 35 and shaft 50 will drivingly connect turbine 35 to intermediate shaft 50 whenever impeller 22 is driven by shaft 10 at a greater speed of rotation than that of shaft 50. When clutch 16, 17 is actuated to connect shaft 50 to shaft 10, the one-way clutch 36 will permit the turbine 35 to idle. It will be understood that when clutch 16, 17 is engaged, clutch 19 will normally be disengaged so that both the converter impeller 22 and turbine 35 idle to eliminate hydrodynamic loss in the torque converter.

Referring particularly to Fig. 2, which is an enlarged view of the improved clutch assembly, clutch drum 14 has splined thereto a pair of clutch pressure plates 40 and 41 and has affixed thereto a clutch surface 42. Pressure plates 40 and 41 are axially movable with respect to drum 14, but rotate therewith. Radial plate 15, bolted to clutch drum 14, is a unitary structure shaped to perform a plurality of functions, to reduce costs of manufacture, and to provide for quick and easy assembly and disassembly of the clutch unit. Plate 15 is provided with a boss 43 shaped to provide a first cylindrical chamber 58 adjacent wall portion 44 adapted to receive a piston 45 therein, and a second cylindrical chamber 65a adjacent wall portion 46 adapted to cooperate with an external piston 47. An opening 48 in cylindrical portion 44 is adapted to receive a pin 49 whereby piston 45 may be pinned to plate 15 to be rotatable therewith, but axially movable with respect thereto. Piston 45 is supported for axial motion between upper and lower wall portion 52 and 53 of chamber 58. The wall portion 53 carries an annular backing member 54, the backing member having its outer periphery disposed within a lip 55 of piston 45 and being held at its inner periphery by means of a snap ring 56. A spring 57 seated upon backing member 54 and piston 45 will release piston 45 from cone clutch 19 upon release of fluid pressure from a chamber 58. It will be observed that annular backing member 54 cooperates with lip 55 of piston 45 to prevent any torsion or twisting of piston 45 with respect to flange 15. Pin 49 also acts to assist backing member 54 to maintain piston 45 in proper alignment with flange 15.

The axially extending wall portion 53 of plate 15 is supported upon a housing sleeve 75 there being a sleeve 76 housing sleeve 75 and sleeve 21.

Bolted to radially extending plate 15 at a point opposite boss 43 is a boss 59. Mounting bolt 60 carries a bushing 61. External piston 47 is formed with an upstanding lip 62 on axially extending cylindrical wall 63, and an axially extending cylindrical wall 64 joined by web 65; cylindrical surface 63 of piston 47 rides upon axially extending flange 46a of plate 15 while cylindrical surface 64 of piston 47 rides upon housing sleeve 75. By supporting the external piston 47 upon both flange 15 and housing sleeve 75, the piston is kept in proper alignment with flange 15. A servo chamber 65a is adapted to receive fluid under pressure in a manner hereafter described.

A Belleville spring 66 mounted upon bushing 61 between bosses 43 and 59 contacts lip 62 of piston 47 and an annular force transfer ring 67. Ring 67 carries a stud bolt 68 secured to presser plate 40. Bolt 68 extends through a bushing 69 in an opening in radially extending flange 15. Upon admission of fluid pressure to chamber 65a, piston 47 will actuate Belleville spring 66 to apply clutch plates 16, 17. Plate 15 also has bolted thereto a cone clutch member 70. Upon admission of fluid pressure to piston chamber 58, conical surface 71 of piston 45 will force conical clutch 19 against conical clutch member 70 to drive sleeve 21.

It will be noted that the clutch and piston arrangements shown and described are compact and conservative of space both axially and radially. This is of importance in transmission assembles, particularly for vehicle transmissions wherein space availability is limited. An additional feature is the location of the pistons radially adjacent the axis of rotation of the assembly while at the same time locating the clutching members radially outwardly of the piston members to provide sufficient clutching size to carry the load. By providing the twin clutch plates 16 and 17, rather than a single clutch plate, longer life and greater capacity is assured with clutch plates of a minimum diameter. By positioning the clutch actuating pistons radially inwardly and adjacent the axis of rotation, the centrifugal force effect of working fluid in the piston chambers is minimized. This prevents undesired clutch engagement and clutch drag due to centrifugal force acting upon fluid in chambers 58 and 65a and in addition provides for more rapid exhaust of fluid from chambers 58 and 65a when clutch disengagement is called for. By forming radial plate 15 with laterally extending piston receiving chamber 58 at one side thereof and chamber 65a at the opposite side thereof, economy of manufacture and economy in space requirements are obtained. The clutch hub 14 and plate 15 form an enclosure for all of the clutch members and one servo thereby preventing foreign matter having access to the clutch members.

In Fig. 2, oil is supplied to and exhausted from piston chamber 58 through groove 72 and port 73 in housing sleeve 75. Oil is supplied to and exhausted from piston chamber 65a through groove 74 in housing sleeve 75.

The manner in which working fluid such as oil is supplied to grooves 72 and 74 of housing sleeve 75 is shown in Figs. 4, 5 and 6. As shown in Fig. 5, fluid under pressure for actuating the double clutch 16, 17 may be admitted to a chamber 77 between housing sleeve 75 and sleeve 76 by way of a passage 37. A series of grooves 78, 79 and 80 formed in sleeve 76, provide channels whereby fluid under pressure may be conducted axially along sleeve 76 from chamber 77 to a series of ports 81, 82, and 83 drilled in housing sleeve 75, see Figs. 4 and 6. Ports 81, 82 and 83 communicate with groove 74 in housing sleeve 75, the groove 74 in turn being in communication with chamber 65a associated with piston 47. Oil under pressure for actuating cone clutch piston 45 may be admitted to a chamber 85 between housing sleeve 75 and sleeve 76 by way of a passage 38. It will be noted that chambers 77 and 85 at opposite sides of housing portion 101 are hydraulically separated from each other by contact of sleeve 76 with housing 101. A series of grooves 86, 87 and 88 in sleeve 76 conduct oil from chamber 85 to drilled openings 89, 90 and 91 in housing sleeve 75 to admit oil to groove 72 of sleeve 75. Oil from groove 72 is conducted through port 73 (see Fig. 2) to chamber 58 associated with annular piston 45 to apply the cone clutch 19.

As shown in Figs. 4 and 5, a channel 92 in sleeve 76 communicates with groove 74 of Fig. 4 by a port 94 so that fluid pressure supplied to direct drive clutch chamber 65a of Figs. 1 and 2 is also conducted through channel 92 and a port 93 to a signal pressure passage 39 for purposes hereafter more particularly set forth.

Referring to Fig. 3, there is shown the planetary gearing unit C of Fig. 1 in enlarged detail. The gearing unit C is adapted to selectively provide neutral or no drive, direct drive or reduction drive of an output shaft 110 which may be connected in conventional manner to the rear wheels of the vehicle, not shown. Shaft 110 has affixed thereto an upstanding flange 111 which forms a planet carrier for planet gears 112. Planet carrier 111 has an extension 113 which carries a sun gear 114 of a second planetary gearing system. Splined to the end of intermediate shaft 50 is a drum 51 which carries a relatively long ring gear 115. A hollow tubular sleeve 116 is rotatably supported upon shaft 110, sleeve 116 being rotatable with respect to shaft 110. Sleeve 116 carries a sun gear 117 formed thereon and has a clutch hub 118 splined thereto so as to be rotatable with the sleeve. An upstanding flange 119 splined to sleeve 116 forms a clutch chamber 129 for a piston 128, the member 119 having a conical brake member 120 splined thereto. Brake member 120 is axially movable but non-rotatable with respect to member 119. Planet gear 112 supported upon stub shaft 121 meshes with ring gear 115 and sun gear 117. A second planet gear 122 supported upon stub shaft 123 in a planet carrier 124 meshes with ring gear 115 and sun gear 114. A plurality of clutch plates 125 are splined to carrier 124, the clutch plates being axially movable with respect to the carrier. Planet carrier 124 also has formed thereon an upwardly extending dog tooth ring 126. Clutch hub 118 carries a plurality of clutch plates 127 splined thereto and axially movable with respect thereto. A clutch actuating piston 128 is disposed in a cylinder chamber 129 formed by member 119. A clutch release spring 130 seated upon clutch hub 118 yieldably biases piston 128 toward a clutch release position. Oil under pressure may be admitted to chamber 129 by way of a passage 131 from a conduit 108. The transmission casing section 104 is provided with a splined portion 132, the splines 132 cooperating with splines 133 formed upon an annular piston 134 to permit axial motion of piston 134 with respect to housing 104. Piston 134 carries a dog brake tooth member 135 adapted to mesh with dog tooth member 126 of carrier 124 when fluid pressure is admitted to the piston chamber 137 by way of a passage 107 and a port 136. A dog brake release spring 138 yieldably biases piston 134 to release the dog teeth 126—135 whenever fluid pressure is exhausted from chamber 137. A conical brake member 139 fixed to housing 104 provides a brake surface for cooperation with conical brake member 120, the member 139 being formed with a cylindrical extrusion 140 which constitutes a stop member for limiting the permissible range of piston 134 under action of spring 138.

An end housing member 105 is provided with an insert 141 which is drilled for passage 131 and which, together with housing 105 forms a piston chamber 142 adapted to receive an annular piston 143 having a conical braking surface 144 therein. The base of member 141 carries a backing member 145 for a brake release spring 146. Spring 146 yieldably biases piston 143 to release braking surfaces 144—120 when fluid pressure is released from piston chamber 142. Fluid under pressure may be admitted to chamber 142 by way of a passage 106 and a port 147.

*Gearing operation*

Power shaft 10 is driven by the vehicle engine, not shown, and drives sleeve 13 and clutch drum 14 through gears 11 and 12 whenever the engine is operating. Fluid under pressure may be admitted to clutch servo chamber 58 as heretofore described to drive intermediate shaft 50 through torque converter A. Fluid pressure may be admitted to clutch servo chamber 65a as heretofore described to cut out the torque converter and to drive shaft 50 through clutch 16—17 in what may be termed direct drive. When cone clutch 19 is engaged and plate clutch 16—17 released, shaft 50 will be driven by torque converter A through one-way clutch 36. The drive ratio imparted to shaft 50 may vary from a low ratio with high torque multiplication to direct one to one drive through converter A depending upon the load on shaft 50 and the power applied to impeller 22. At high vehicle speeds, torque converter A will act as a fluid coupling giving substantially one to one drive. The same condition may obtain low vehicle speeds when a relatively small amount of power is applied to impeller 22. Clutches 16—17 and 19 may be simultaneously applied to provide hydrodynamic braking as hereafter more clearly explained.

The planetary gearing system is arranged to provide neutral or no drive to shaft 110, direct drive wherein shaft 110 is directly connected to shaft 50, reduction drive wherein shaft 110 rotates more slowly than shaft 50, or reverse wherein shaft 110 rotates in the opposite direction to shaft 50. For neutral, brake servo chamber 142, clutch servo chamber 129, and brake servo chamber 137 are each exhausted. In this condition of operation there is no reaction member effective in the planetary gearing unit. The gears will therefore planetate freely by virtue of rotation of shaft 50, but will be unable to transmit any torque to load shaft 110.

For reduction drive of shaft 110, fluid pressure may be admitted to brake servo chamber 142, to apply cone brake 120. This stops rotation of sun gar 117. Ring gear 115 will thereupon drive shaft 110 through planet gears 112 and carrier 111 at a reduced speed as compared to the speed of rotation of shaft 50. Shaft 110 will be driven through the planetary gearing unit at a fixed mechanical torque multiplication as determined by the gear ratio of the planetary gearing. Shaft 50 may be driven either at one to one ratio through clutch 16—17 or through converter A by clutch 19. As heretofore explained, shaft 50 will be driven at a variable torque multiplication depending upon speed and load when drive is had through torque converter A.

For direct drive of shaft 110, fluid pressure may be admitted to clutch servo chamber 129 to apply clutch plates 125—127. This will lock sun gear 117 to carrier 124 to cause the sun gear and carrier to rotate as a unit. Shaft 110 will then rotate at the same speed as shaft 50 without torque multiplication in the planetary gearing system.

For reverse, fluid pressure may be admitted to brake servo chamber 137 to engage brake dog teeth 135 and 126. This will lock planet carrier 124 to housing 104 and thereby prevent rotation of planet carrier 124. With planet carrier 124 fixed against rotation, reverse drive of shaft 110 with respect to shaft 50 will obtain.

*Transmission controls*

In Fig. 7, there is shown a schematic diagram of a control system for controlling drive through the transmission of Figs. 1, 2 and 3. The control system includes a manually operable forward, neutral, reverse selector valve 167, a solenoid valve 192 for controlling the drive ratio of the planetary gearing, and a pair of valves 213, 214, which in conjunction with manual valve 167 and drive ratio control valve 192 are operative to provide drive of the planetary gearing unit through direct drive double plate clutch 16, 17 independently of torque converter A of Figure 1; to provide drive of the planetary gearing unit solely through the torque converter unit A by applying cone clutch 19 of Fig. 1, or to provide simultaneous application of plate clutch 16—17 and cone clutch 19 to provide hydrodynamic braking of the vehicle in addition to normal engine braking when desired.

An engine driven pump 150, which may be driven by a gear 9 on shaft 10 (see Fig. 1) may draw oil from the transmission sump (not shown) by way of suction passage 151 and deliver the oil under pressure to a pressure supply passage 152 leading to a pressure regulator valve 153 and to a port 166 of a valve body 165. Pressure regulator valve 153 comprises a piston 154 yieldably biased by a spring 155 to cut off a port 156 from a port 157 until a predetermined pressure value, for example, 100 pounds per square inch is obtained in pressure supply passage 152. At this predetermined pressure, piston 154 will move against spring 155 to connect port 156 to port 157. A second pressure regulator valve 158 includes a piston 159 spring biased by a spring 160 to cut off a pressure delivery port 161 from port 157 whenever the pressure delivered by port 157 of valve 153 and acting upon piston 159 is less than a predetermined value, for example, 50 pounds per square inch. When the pressure acting upon piston 159 exceeds the predetermined value, piston 159 compresses spring 160 and connects port 161 to an exhaust port 162. Delivery port 161 delivers fluid under pressure to a pressure supply passage 163. Thus, the pressure in passage 152, which is the pressure utilized for actuating the planetary gearing servos, is relatively high as compared to the pressure supplied to passage 163. This arrangement makes possible the use of relatively small servos in the planetary gearing unit so that the gearing unit may be compact and conservative of space. The relatively low pressure in passage 163 which is utilized to actuate the torque converter cone clutch 19 and the plate clutch 16—17 of Fig. 1 is adequate because these clutches are not subject to torque multiplication as is true of the clutch and brakes of the planetary gearing unit. By maintaining a relatively low pressure in clutch control portion of the system served by passage 163, savings in engine horsepower consumption utilized to develop pressure are accomplished.

Passage 163 is branched at 163a to deliver fluid under pressure to fill the torque converter A of Fig. 1, and to deliver fluid to the transmission for lubrication purposes. Passage 163 delivers fluid under pressure to a port 164 of a valve body 208 and is branched at 163b to deliver fluid under pressure to an engine brake solenoid valve 210 and to a governor controlled direct clutch solenoid valve 212 for purposes hereafter more particularly set forth.

Pressure supply passage 152 connects to a port 166 of a valve body 165 having a forward, neutral, reverse valve 167 which may be selectively positioned by the vehicle operator to select forward drive, neutral, or reverse drive of the output shaft 110 of the planetary gearing unit driven by shaft 50 of Fig. 1. Valve 167 may be controlled by a selector lever 169 located in the vehicle driver compartment and connected to valve 167 by a suitable linkage 168. A blocking mechanism 170 is provided to prevent accidental or unintentional shift to reverse when the vehicle is moving in a forward direction. A piston 172 in a cylinder 171 carries a stem 173, the piston being yieldably spring biased by a spring 174 to position stem 173 in the path of travel of the control linkage for valve 167 in such manner that lever 169 can be moved to select reverse drive only after the vehicle brakes have been applied. A vehicle brake pedal 175 is arranged to open a valve 176 when the brake pedal is depressed to admit vehicle brake actuating fluid such as oil or air under pressure from a pressure supply passage 177 to a passage 178 to apply the vehicle brakes. Passage 178 is also extended to a chamber 179 beneath piston 172 so that brake actuating fluid will move piston 172 against spring 174 to withdraw stem 173 from the path of travel of linkage 168, thereby permitting handle 169 to be moved to its reverse position. The brake actuating fluid is carried at a rather high pressure, for example, forty or more pounds per square inch and will therefore assure that the vehicle brakes are fully applied before shift to reverse can be made.

Valve 167 is illustrated in its forward drive range position in Fig. 7. The valve includes a pair of spaced lands 180 and 181 joined by a reduced stem portion 182 and connected to link 168 by a stem 183. Valve body 165 is provided with a chamber 184 at one end of land 180 and connected to an exhaust port 185 to provide continuous discharge of any fluid which may leak past valve land 180. Ports 186 and 187 connect to a cross-over passage 188. Port 166 is the pressure supply port whereby fluid under pressure from passage 152 may be admitted to the valve body. Port 189 connects to a reverse brake apply passage 107 which leads to chamber 137 of Fig. 3 to establish reverse drive when supplied with fluid under pressure. Port 190 is an exhaust port which connects the valve bore to an exhaust port 191.

Valve 192 in valve body 165 is a solenoid actuated drive ratio control valve for selecting either reduction drive or direct drive of the planetary gearing unit of Fig. 3. The valve includes lands 193, 194 and 195 and a stem 196 joined by reduced stem portions 197, 198 and 199. Stem 196 is yieldably biased by a spring 200 to position valve 192 to admit fluid under pressure from cross-over passage 188 to a direct drive clutch apply passage 108 leading to chamber 129 of Fig. 3 to apply the direct drive clutch of the planetary gearing unit. Port 201 connects to exhaust port 185. Port 202 connects the valve bore to direct drive clutch apply passage 108. Port 203 connects the valve bore to cross-over passage 188. Port 204 connects the valve bore to a reduction drive brake apply passage 106. Port 205 connects the valve bore to exhaust port 191. Port 206 connects the valve bore to direct drive clutch apply passage 108. Reduction drive brake apply passage 106 leads to servo chamber 142 of Fig. 3 to apply cone brake 120 of Fig. 3 whenever pressure is admitted to passage 106. A solenoid coil 207 extends around stem 196 and when energized, coil 207 moves valve 192 against the action of spring 200 to connect direct drive clutch apply passage 108 to exhaust port 191 by way of ports 206 and 205. At the same time, reduction brake apply passage 106 is connected to cross-over passage 188 by way of ports 203 and 204 to establish reduction drive through the planetary gearing unit. Thus, when solenoid coil 207 is energized valve 192 is positioned for reduction drive through the planetary gearing unit and when coil 207 is de-energized, spring 200 positions valve 192 for direct drive.

Fluid under pressure in passage 163 is directed to port 164 of a valve body 208, and by branch passage 163b to a port 209 of a solenoid valve 210 and to a port 211 of a solenoid valve 212. Valve body 208 contains a pair of valves 213 and 214 which in conjunction with valves 167 and 192 are operative to provide drive through the planetary gearing through plate clutch 16—17 of Fig. 3 and independently of the torque converter, to provide drive through the planetary gearing solely through the torque converter, or to provide dual simultaneous application of plate clutch 16—17 and cone clutch 19 to provide hydrodynamic vehicle braking in addition to normal engine braking when desired.

Pressure supply passage 163 admits fluid under pressure to valve body 208 through port 164, the port 164 being connected to a cross-over passage 234 terminating at ports 234a and 234b. Valve body 208 has a pair of valves 213 and 214 therein. Port 215 connects a chamber 216 at one end of valve 213 to pressure signal passage 39. Port 217 connects to passage 37 leading to chamber 85 between housing 101 and sleeve 76 (see Fig. 5). Port 218 connects the valve bore to exhaust port 219. Port 220 connects a chamber 222 at one end of valve 213 to a passage 221. Valve 213 includes lands 223 and 224 joined by reduced stem 225, the valve being yieldably biased by a spring 226 to connect crossover passage 210 to passage 37 through ports 211 and 217.

Valve 214 includes lands 227 and 228 joined by a reduced stem section 229. Port 230 connects the valve bore to a passage 38 leading to chamber 77 between housing 101 and sleeve 76 (see Fig. 5). Port 231 connects the valve bore to exhaust port 219. Port 232 connects a chamber 233 at one end of valve 214 to a passage 265 leading to valve 212. Valve 214 is yieldably spring biased by a spring 227a to connect ports 230 and 231 to exhaust port 219 as shown.

Solenoid valve 210 includes a plunger 235 spring biased by a spring 236 to block off port 209 and to connect passage 221 to exhaust by way of ports 237 and 238. A solenoid coil 239 may be energized by closing a switch 240 to connect the solenoid coil to a battery 241. When energized, coil 239 raises plunger 235 against the action of spring 236 to close off exhaust port 238 and to admit pressure from passage 163b to chamber 222 by way of ports 209, 237, passage 221 and port 220. The pressure thus admitted to chamber 222 will permit spring 226 to position valve 213 in the position shown irrespective of the action of any fluid pressure which may be acting upon valve 213 in chamber 216.

Solenoid valve 212 is similar to valve 210, the valve 212 having a plunger 242 spring biased by a spring 243 to block off port 211 from a port 244, and to connect port 244 to an exhaust port 245. A solenoid coil 246 may be energized by closing a switch 247 to connect coil 246 to battery 241. Switch 247 is a governor switch which will be open at speeds below a predetermined speed and closed at speeds above the predetermined speed, for example, 18 miles per hour. Governor switch 247 is responsive to vehicle speed and is a standard item. Further description of switch 247 is, therefore, not thought to be necessary. An additional switch 248 is provided to control solenoid 207 to determine the drive ratio of the planetary gearing unit. Switches 240 and 248 may be located in the vehicle driver compartment for easy access by the vehicle operator. When switch 248 is open, valve 192 is positioned to establish direct drive through the planetary gearing unit. When switch 248 is closed, valve 192 is positioned to establish reduction drive through the planetary gearing unit. Switch 240 is normally open and is used only to establish hydrodynamic breaking when closed.

An additional switch 250 controlled by the vehicle accelerator pedal 249 is provided to establish drive through the torque converter at vehicle speeds at which governor switch 247 has been closed to establish drive through the plate clutch 16—17 of Fig. 2. The arrangement is such that accelerator pedal 249 is movable through a first range of motion wherein the engine throttle (not shown) may be moved from its closed to fully opened position. After full throttle has been reached, further downward movement of accelerator pedal 249 will cause a rod 251 carried by the accelerator pedal 249 to open switch 250. By this arrangement the vehicle operator may establish drive through the torque converter for additional torque multiplication and acceleration simply by depressing the accelerator pedal and without changing the drive ratio of the planetary gearing unit.

*Modified planetary gearing unit*

A modified planetary gearing unit which may be substituted for the planetary gearing unit of Figs. 1 and 3 is shown in Figs. 8 and 9. The general arrangement of Fig. 8 is similar to that of Fig. 3 insofar as the drive arrangement is concerned. In Figs. 8 and 9, however, there is pivotal pawl arrangement provided for preventing rotation of planet carrier 124 when reverse drive is desired.

In Fig. 8, similar numbers are used as found in Fig. 3 for corresponding parts. A hub 51 splined to shaft 50 carries ring gear 115 which meshes with planet gears 112 and 122. Sleeve 116 carries a sun gear 117 in mesh with planet gear 112. Extension 113 of planet carrier 111 is provided with sun gear 114 in mesh with planet gear 122. Planet carrier 124 has clutch plates 125 splined thereto and carries teeth 126. Clutch hub 118 splined to sleeve 116 carries clutch plates 127 splined to hub 118. Clutch actuating piston 128 is responsive to pressure admitted to chamber 129 to apply clutch plates 125—127 for direct drive. Spring 138 is a clutch release spring. Piston 143 is responsive to fluid pressure in chamber 142 to apply cone brake 120 for reduction drive. Fluid under pressure may be admitted to chamber 129 by way of port 131 and passage 108 of Fig. 7. Fluid under pressure may be admitted to chamber 142 by way of port 147 and passage 106 of Fig. 7. Spring 146 is a U-shaped brake release spring.

In Fig. 9 planet carrier 124 is illustrated as having teeth 126 thereon. These teeth 126 extend entirely around the outer circumference of the laterally extending web on which they are formed.

Housing 104 is formed with a cylinder chamber 252 having a piston 253 therein, a port 254 to admit fluid pressure to chamber 253. Port 254 may be connected to reverse brake apply passage 107 of Fig. 7. Pivotally mounted on housing 104 at 255 is a bellcrank lever 256 having arms 257 and 258. Arm 257 carries a boss 259 adapted to contact a boss 253a of piston 253 and also is formed with teeth 260 adapted to engage teeth 126 of planet carrier 124. Arm 258 is spring biased by a spring 261 seated upon housing 104 to rotate about axis 255 to release teeth 260 from teeth 126 when fluid pressure is exhausted from chamber 252. The arrangement of Fig. 9 provides a ratcheting effect in the event that there is slow forward vehicle motion at the time that shift into reverse is attempted.

Port 131 of Fig. 8 is to be connected to passage 108 of Fig. 7. Port 147 of Fig. 8 is to be connected to passage 106 of Fig. 7. Port 254 of Fig. 9 is to be connected to passage 107 of Fig. 7. Thus, the control system of Fig. 7 may be utilized in conjunction with either the arrangement of Fig. 3 or that of Figs. 8 and 9.

*Operation of control system*

In the control system of Fig. 7, manual valve 167 is positioned for "Forward" drive, solenoid valve 192 is positioned for direct drive in the planetary gearing unit, and valve 213 is positioned for converter drive. With the vehicle engine running, pump 150 will supply oil under a relatively high pressure to passage 152 and oil under relatively low pressure to passage 163. Oil from passage 152 is conducted to direct drive clutch apply passage 108 through ports 166, 187, passage 188, and ports 202 and 203 of valve body 165. Passage 108 connects to port 131 leading to servo chamber 129 (see Fig. 3). Fluid pressure in chamber 129 moves piston 128 against clutch release spring 138 to apply clutch plates 125—127 for direct drive through the planetary gearing unit C of Fig. 3. Reduction drive brake apply passage 106 is connected to exhaust port 191 by way of ports 204 and 205, see Fig. 7. Reverse brake apply passage is connected to exhaust port 191 by way of ports 189 and 190.

Fluid pressure supply passage 163 is connected to the converter clutch pressure supply passage 38 by way of port 164, passage 234 and ports 234a and 217 of valve body 208. Passage 38 connects to chamber 85, the chamber 85 being connected to servo chamber 58 (see Fig. 2) to apply cone clutch 19 as heretofore explained. Direct drive clutch apply passage 37 is connected to exhaust port 219 by way of ports 230 and 231. Chamber 77, connected to passage 37, is connected to direct drive clutch servo chamber 65a of Fig. 2 as heretofore explained. With the valving positioned, as shown in Fig. 7, shaft 50 will be driven through torque converter A while shaft 110 will be clutched directly to shaft 50. The vehicle will normally be initially started through torque converter A with the planetary gearing in direct drive.

Upon acceleration of the vehicle to a predetermined vehicle speed, governor switch 247 will close to energize solenoid valve 212 to thereby admit fluid under pressure from branch passage 163b to chamber 233 of valve body 208 through ports 234a—244 of valve 212 and passage 265. Fluid pressure acting in chamber 233 will move valve 214 against spring 227a to block off port 231 and to admit pressure fluid from passage 163 to passage 37 by way of ports 234 and 230. Chamber 77, connected to passage 37 supplies fluid to servo chamber 65a of Fig. 2 as heretofore explained, the pressure in chamber 65a being effective to move piston 65 against belleville spring 66 to apply clutch plates 16—17 for direct drive. It will be noted that during the interval at which the direct drive clutch 16—17 is being applied that cone clutch 19 remains applied so that there is a momentary overlap of torque transfer through both clutches. Due to the action of one-way clutch 36 of Fig. 1, there is no jerk or dog-fight during this shift interval. As soon as the direct drive clutch 16—17 is engaged sufficiently to carry the load, one-way clutch 36 releases so that the converter does not drive the shaft 50 even though clutch 19 may still be momentarily engaged. As heretofore explained, passage 39 is hydraulically connected to chamber 77 of Fig. 7 so that clutch actuating pressure in chamber 77 is conducted through passage 39 to chamber 216 of valve body 208 through port 215. This direct drive clutch actuating pressure in chamber 216 will move valve 213 against spring 226 to connect chamber 85 and passage 38 to exhaust port 219 by way of ports 217 and 218. The converter drive clutch will then be released so that impeller 22 as well as turbine 35 will cease to rotate. This arrangement is of advantage not only because the hydraulic converter losses are eliminated in direct drive, but also because it permits a shift under torque without engine run-away. In this manner the need for throttle retarding devices as heretofore employed is eliminated.

For neutral operation, valve 167 of Fig. 7 may be positioned to block off fluid pressure supply passage 152 and to connect cross-over passage 188 to exhaust port 185 by way of port 186 and chamber 184. In this condition of operation, no pressure may be supplied to either passage 106 or 108 so forward drive through the planetary gearing is impossible. Reverse brake apply passage 107 is exhausted through ports 189, 190 and port 191. With all three passages 106, 107 and 108 connected to exhaust, a positive neutral or no drive condition prevails.

In the event that "low range" torque multiplication in the planetary gearing unit is desired, switch 248 may be closed to energize solenoid coil 207. Such action will position valve 193 to connect cross-over passage 188 to passage 106 by way of ports 203 and 204 and connect passage 108 to exhaust port 191 by way of ports 206 and 205. Passage 106 connects to servo chamber 141 of Fig. 3, the pressure in chamber 141 being effective to move piston 143 against brake release spring 146 to apply cone brake 120. Brake 120 prevents rotation of sun gear 117 to provide reduction drive.

For reverse operation, manual valve 167 is positioned to connect reverse brake apply passage 107 of Fig. 7 to pressure supply passage 152 by way of ports 166 and 189. Cross-over passage 188 is connected to exhaust port 185 by way of port 186 and chamber 184. Passage 107 connects to servo chamber 137 of Fig. 3, the fluid pressure in chamber 137 being effective to move piston 134 against release spring 138 to apply dog teeth 126—135. Such action brakes planet carrier 124 for reverse rotation of shaft 110.

Switch 240 of Fig. 7 may be termed an "engine brake" switch used to provide hydrodynamic braking in torque converter unit A of Fig. 1. When closed, switch 240 energizes solenoid coil 239 of valve 210 to cause valve 210 to admit fluid pressure from pressure supply passage 163b to chamber 222 of valve body 208 by way of ports 209, 237, passage 221 and port 220. Assuming the vehicle is operating at a speed above a predetermined vehicle speed, for example 18 to 20 miles per hour, governor switch 247 will close to establish drive through direct drive clutch 16—17, as heretofore explained. If the vehicle operator closes switch 240, fluid pressure in chamber 222 will counteract the effect of fluid pressure in chamber 216, thereby permitting spring 226 to position valve 213 to deliver pressure to passage 38, chamber 85 and servo chamber 58 of Fig. 2 to apply cone clutch 19 even though plate clutch 16—17 is also applied. With this condition of operation, normal engine braking of the vehicle may be obtained because of the engagement of plate clutch 16—17. In addition, the engagement of cone clutch 19 will cause impeller 22 to be driven, thereby setting up hydraulic turbulence within the torque converter. The hydrodynamic braking may be made especially effective by also closing switch 248 to establish reduction drive in the planetary gearing unit. Thus, in descending long grades, switch 240 only or both switches 240 and 248 may be closed to provide different degrees of both engine braking and hydrodynamic braking. This feature minimizes the necessity of using the vehicle brakes with consequent savings in maintenance and repair costs, as ordinarily encountered in vehicles not provided with hydrodynamic braking features.

As heretofore explained, switch 250 is normally closed, but may be opened by pressing accelerator pedal 241 past full throttle position to change from direct drive to converter drive for increase in vehicle acceleration. In addition, switch 248 may also be closed to establish reduction drive in the planetary gearing unit for maximum vehicle acceleration. Either feature may be used singly, or they may be used jointly for maximum torque multiplication.

From the foregoing description it will readily be apparent that by placing both the converter drive clutch and the direct drive clutch together with one of the servo pistons within the chamber formed by clutch drum 14 and plate 15, that a minimum of axial space is utilized. By placting piston 47 on plate 15 exterior of the clutch chamber, both pistons 47 and 45 are positioned radially inwardly close to the axis of rotation of the clutch drum. This minimizes centrifugal force effect of oil supplied to the piston. The arrangement whereby valve 213 is made responsive to pressure supplied to servo chamber 65a, assures torque overlap in shifting the drive from clutch 19 to clutch 16—17. The provision of switch 240 and solenoid valve 210 makes possible hydrodynamic braking as well as normal engine braking. Switch 250 controlled by accelerator pedal 249 enables a change from direct drive to converter drive without disturbing the drive ratio of the planetary gearing unit. The transmission assembly has been constructed to utilized minimum space requirements and to be quickly and easily assembled for service purposes.

The preceding description recites the advantages and useful results of the invention, and there has been embodied therein a number of novel features in combination, which are subject to changes in the specific form of structure and arrangement without departing from the spirit and scope of the invention, as set forth in the appended claims.

We claim:

1. In combination in a transmission having a power input shaft and a power output shaft, clutch means including a pair of clutches for selectively transferring torque from said input shaft to said output shaft, said clutch means including a rotatable clutch drum driven by said power shaft, said clutch drum having a member thereof positioned radially with respect to the axis of rotation of said drum and having axially extending servo chambers at opposite sides thereof, said clutch drum providing an enclosure, said clutch means being positioned within said enclosure, a piston for actuating one of said clutches positioned within said enclosure, a piston for actuating the other of said clutches supported upon said drum member externally of said enclosure, actuating means operatively connecting said last-mentioned piston to one of said clutchts, a fluid pressure source, and valve means for controlling the admission of fluid pressure from said source to said servo chambers, said valve means being operative to selectively direct fluid pressure to said servo chambers to engage said clutches selectively, said valve means being also effective to direct fluid pressure from said source to both of said servo chambers to engage both of said clutches simultaneously.

2. In combination in a transmission having a power input shaft and a power output shaft, a pair of clutches selectively operable for transmitting torque from said input to said output shaft, a rotatable clutch drum driven by said power input shaft, a plate member secured to said clutch drum positioned radially with respect to the axis of rotation of said clutch drum and forming therewith an enclosure, said plate member having axially facing servo chambers at opposite sides thereof, piston means responsive to fluid pressure in said servo chambers, respectively, one of said pistons being positioned within said enclosure and the other of said pistons being positioned exteriorly of said enclosure, both of said clutches being positioned within said enclosure, force transfer means supported upon said plate member to operatively connect one of said pistons to one of said clutches, a fluid pressure source, and valve means for selectively directing fluid pressure from said source to said servo chambers, to selectively engage said clutches, said valve means being also effective to direct fluid pressure from said source to both of said servo chambers to engage both of said clutches simultaneously.

3. In combination in a transmission having a power input shaft and a power output shaft, clutch means for selectively transferring torque from said input shaft to said output shaft through different torque paths, said clutch means including a rotatable clutch drum driven by said input shaft, a plate member secured to said clutch drum and positioned radially with respect to the axis of rotation of said clutch drum, said clutch drum and plate member forming an enclosure containing a pair of clutches, said plate member being shaped to form a first servo chamber within said enclosure and a second servo chamber exterior of said enclosure, a fluid pressure source, fluid pressure responsive clutch actuating pistons responsive to fluid pressure directed to said servo chambers, respectively, force transfer means operatively connecting the servo piston exterior of said chamber to one of said clutches within said chamber, said pistons being positioned radially inwardly toward the axis of rotation of said clutch drum from the clutches actuated thereby, respectively, and valve means for controlling the admission of fluid pressure from said source to said servo chambers, said valve means being operative to selectively direct fluid pressure to said servo chambers to engage said clutches, selectively, said valve means being also effective to direct fluid pressure from said source to both of said servo chambers simultaneously to engage both of said clutches simultaneously.

4. In combination in a transmission, a power shaft, a load shaft, a clutch drum rotatably driven by said power input shaft, a plate member radially disposed with respect to the axis of rotation of and carried by said clutch drum, said drum and plate forming an enclosure, a pair of clutches disposed in said enclosure, said plate member being formed to provide a servo chamber within said enclosure and a servo chamber positioned exterior of said enclosure, pistons associated with each of said chambers, respectively, force transfer means carried by said plate member for operatively connecting one of said pistons to one of said clutches, a fluid pressure source, and valve means for controlling the admission of fluid pressure to said servo chambers, said valve means being operative to selectively direct fluid pressure to said servo chambers to engage said clutches, selectively, said valve means being also effective to direct fluid pressure from said source to both of said servo chambers to engage both of said clutches simultaneously.

5. In combination in a transmission, a power shaft, a load shaft, a clutch drum rotatably driven by said power shaft, a pair of clutches adapted to connect said power shaft and load shaft through different torque paths, a plate member carried by said clutch drum and disposed radially with respect to the axis of rotation of said clutch drum, said drum and plate forming an enclosure, said clutches being disposed inside said enclosure, control chambers at each side of said plate member, piston means associated with said control chambers, respectively, for actuating said clutches, respectively, force transfer means for operatively connecting one of said clutches to one of said pistons, a fluid pressure source, valve means including a pair of valves for controlling the admission of fluid pressure from said source to said control chambers, means yieldably biasing one of said valves to connect one of said control chambers to said fluid pressure source, means yieldably biasing the second of said valves to connect the other of said control chambers to exhaust, and speed responsive means operable to position said second valve to connect said second control chamber to said fluid pressure source, said first-mentioned valve being responsive to fluid pressure supplied to said second-mentioned control chamber by said second-mentioned valve to connect said first-mentioned control chamber to exhaust.

6. In combination in a transmission, a power shaft, a load shaft, a clutch drum rotatably driven by said power shaft, a pair of clutches adapted to connect said power shaft and load shaft through different torque paths, a plate member carried by said clutch drum and disposed radially with respect to the axis of rotation of said clutch drum, said drum and plate forming an enclosure, said pair of clutches being disposed in said enclosure, control chambers at each side of said plate member, piston means associated with said control chambers, respectively, force transfer means supported upon said plate member operatively connecting one of said pistons to one of said clutches, a fluid pressure source, valve means for controlling the admission of fluid pressure from said source to said control chambers, means yieldably biasing said valve means to admit fluid pressure to one of said control chambers to connect said load shaft to said power shaft through one of said clutches, means for positioning said valve means to admit fluid pressure to the other of said control chambers to connect said power shaft to said load shaft through the other of said clutches, and manually controlled means for positioning said valve means to admit fluid pressure to both of said control chambers to connect said power shaft to said load shaft through both of said clutches.

7. In combination in a transmission, a power shaft, a load shaft, a pair of clutches adapted to connect said power shaft and load shaft through different torque paths, fluid pressure responsive servo members for actuating said clutches, respectively, a fluid pressure source, valve means for controlling the admission of fluid pressure from said source to said servo members, means yieldably biasing said valve means to admit fluid pressure to one of said servo members to connect said load shaft to said power shaft through one of said clutches, means for positioning said valve means to admit fluid pressure to the other of said servo members to connect said power shaft to said load shaft through the other of said clutches, and manually controlled means for positioning said valve means to admit fluid pressure to both of said servo members to connect said power shaft to said load shaft through both of said clutches.

8. In combination in a transmission, a power shaft, a load shaft, a pair of clutches adapted to connect said power shaft to said load shaft through different torque paths, fluid pressure responsive servo members for actuating said clutches, respectively, a fluid pressure source, valve means including a pair of valves for controlling the admission of fluid pressure from said source to said servo members, means yieldably biasing one of said valves to connect one of said servo members to said fluid pressure source, means yieldably biasing a second of said valves to connect the other of said servo members to exhaust, and speed responsive means operable to position said second valve to connect said other control chamber to said fluid pressure source, said first-mentioned valve being responsive to fluid pressure supplied to said other servo by said second-mentioned valve to connect said one servo to exhaust.

9. In combination in a transmission, a power shaft, a load shaft, a pair of clutches adapted to connect said power shaft to said load shaft through different torque paths, fluid pressure responsive servo members for actuating said clutches, respectively, a fluid pressure source, valve means including a pair of valves for controlling the admission of fluid pressure from said source to said servo members, means yieldably biasing one of said valves to connect one of said servo members to said fluid pressure source, means yieldably biasing the second of said valves to connect the other of said servo members to exhaust, means operable to position said second-mentioned valve to connect said other servo member to said fluid pressure source, said first-mentioned valve being responsive to fluid pressure delivered to said other servo by said second valve to connect said first servo to exhaust, and manually controlled means for positioning said first-mentioned valve to deliver fluid pressure to said one servo to connect said load shaft to said power shaft when said second-mentioned valve delivers fluid pressure to said second servo to thereby connect said load shaft to said power shaft through both of said clutches.

10. In combination in a transmission, a power shaft, a load shaft, a pair of clutches adapted to connect said power shaft to said load shaft through different torque paths, fluid pressure responsive servo members for actuating said clutches, respectively, a fluid pressure source, valve means including first and second valves for controlling the admission of fluid pressure to said servo members, means yieldably biasing said first valve to connect one of said servo members to said fluid pressure source, means yieldably biasing said second valve to connect said other servo member to exhaust, a solenoid valve adapted to deliver fluid pressure to a control chamber associated with said second valve, means adapted to energize said solenoid valve, said second valve being responsive to fluid pressure delivered to said control chamber by said solenoid valve to deliver fluid pressure to said other servo, said first valve being responsive to fluid pressure delivered to said other servo to connect said one servo to exhaust, a control chamber associated with said one valve, a solenoid valve for controlling the admission of fluid pressure to said last-mentioned control chamber, and a manually operable switch for energizing said last-mentioned solenoid valve, said first valve being effective to deliver fluid pressure to said one servo when said second-mentioned solenoid valve is energized irrespective of the position of said second valve.

11. In a vehicle transmission, a power shaft, a load shaft, a first clutch operable to establish drive from said power shaft to said load shaft through one torque path, a second clutch operable to establish drive from said power shaft to said load shaft through a second torque path, a first fluid pressure responsive servo for actuating said first clutch, a second fluid pressure responsive servo for actuating said second clutch, a fluid pressure source, valve means including first and second valves for controlling the admission of fluid pressure from said source to said servos, respectively, means yieldably biasing said first valve to admit fluid pressure to said first servo to establish drive through said first clutch, means yieldably biasing said second valve to connect said second servo to exhaust, means including a solenoid valve effective in one operative position to deliver fluid pressure to said second valve, pressure responsive means responsive to fluid pressure delivered by said solenoid valve to position said second valve to direct fluid pressure to said second servo for establishing drive through said second clutch, and pressure responsive means responsive to fluid pressure delivered to said second clutch for positioning said first valve to connect first servo to exhaust.

12. In a vehicle transmission, a power shaft, a load shaft, a first clutch operable to establish drive from said power shaft to said load shaft through one torque path, a second clutch operable to establish drive from said power shaft to said load shaft through a second torque path, a first fluid pressure responsive servo for actuating said first clutch, a second fluid pressure responsive servo for actuating said second clutch, a fluid pressure source, valve means including first and second valves for controlling the admission of fluid pressure from said source to said servos, respectively, means yieldably biasing said first valve to admit fluid pressure to said first servo to establish drive through said first clutch, means yieldably biasing said second valve to connect said second servo to exhaust, means including a solenoid valve effective in one operative position to deliver fluid pressure to said second valve, pressure responsive means responsive to fluid pressure delivered by said solenoid valve to position said second valve to deliver fluid pressure to said second servo for establishing drive through said second clutch, pressure responsive means responsive to fluid pressure delivered to said second clutch for positioning said first valve to connect said first servo to exhaust, additional valve means operable to position said first valve to direct fluid pressure to said first servo for engaging said first clutch when said second clutch is also engaged and driver operable means for controlling said additional valve means.

13. In a vehicle transmission, a power shaft, a load shaft, a first clutch operable to establish drive from said power shaft to said load shaft through one torque path, a second clutch operable to establish drive from said power shaft to said load shaft through a second torque path, a first fluid pressure responsive servo for actuating said first clutch, a second fluid pressure responsive servo for actuating said second clutch, a fluid pressure source, valve means including first and second valves for controlling the admission of fluid pressure from said source to said servos, respectively, means yieldably biasing said first valve to admit fluid pressure to said first servo to establish drive through said first clutch, means yieldably biasing said second valve to connect said second servo to exhaust, means including a switch and a valve controlled by said switch effective in one operative position to deliver fluid pressure to said second valve, fluid pressure responsive means responsive to fluid pressure delivered by said switch controlled valve to position said second valve to direct fluid pressure to said second servo for establishing drive through said second clutch, and pressure responsive means responsive to fluid pressure delivered to said second clutch for positioning said first valve to connect said first servo to exhaust.

14. In a vehicle transmission, a power shaft, a load shaft, a first clutch operable to establish drive from said power shaft to said load shaft through one torque path, a second clutch operable to establish drive from said power shaft to said load shaft through a second torque path, a first fluid pressure responsive servo for actuating said first clutch, a second fluid pressure responsive servo for actuating said second clutch, a fluid pressure source, valve means including first and second valves for controlling the admission of fluid pressure from said source to said servos, respectively, means yieldably biasing said first valve to direct fluid pressure to said first servo to establish drive through said first clutch, means yieldably biasing said second valve to connect said second servo to exhaust, means including a switch, a valve controlled by said switch effective in one operative position to position said second valve to deliver fluid pressure to said second servo for establishing drive through said second clutch, pressure responsive means responsive to fluid pressure delivered to said second clutch for positioning said first valve to connect said first servo to exhaust, and driver operable overcontrol means for positioning said first valve to deliver fluid pressure to said first servo to engage said first clutch when said second clutch is also engaged.

15. In a vehicle transmission, a power shaft, a load shaft, a first clutch operable to connect said power shaft to said load shaft through one torque path, a second clutch operable to connect said power shaft to said load shaft through a second torque path, a first fluid pressure responsive servo for actuating said first clutch, a second fluid pressure responsive servo for actuating said second clutch, a fluid pressure source, valve means including first and second valves for controlling the admission of fluid pressure from said source to said servos, respectively, means yieldably biasing said first valve to direct fluid pressure to said first servo to establish drive through said first clutch, means yieldably biasing said second valve to connect said second servo to exhaust, a switch, a solenoid valve controlled by said switch, pressure responsive means for positioning said second valve to deliver fluid pressure to said second servo to establish drive through said second clutch, said switch being effective in one operative position to position said solenoid valve to deliver fluid pressure to said pressure responsive means associated with said second valve, pressure responsive means responsive to fluid pressure delivered to said second clutch for positioning said first valve to connect said first servo to exhaust, an additional solenoid valve adapted to deliver fluid pressure to said first-mentioned valve, fluid pressure responsive means responsive to fluid pressure delivered by said additional solenoid valve for positioning said first valve to deliver fluid pressure to said first servo to engage said first clutch, and driver operable means for controlling said additional solenoid valve.

16. In a vehicle transmission, a power shaft, a load shaft, a first clutch operable to connect said power shaft to said load shaft through one torque path, a second clutch operable to connect said power shaft to said load shaft through a second torque path, a first fluid pressure responsive servo for actuating said first clutch, a second fluid pressure responsive servo for actuating said second clutch, a fluid pressure source, valve means including first and second valves for controlling the admission of fluid pressure from said source to said servos, respectively, means yieldably biasing said first valve to admit fluid pressure to said first servo to engage said first clutch, means yieldably biasing said second valve to connect said second servo to exhaust, fluid pressure responsive means effective to position said second valve to deliver fluid pressure to said second clutch, a valve adapted to deliver fluid pressure to said fluid pressure responsive means, a switch effective in one operative position to position said last-mentioned valve to deliver fluid pressure to said fluid pressure responsive means, fluid pressure responsive means responsive to fluid pressure delivered to said second clutch for positioning said first valve to connect said first servo to exhaust, and accelerator pedal controlled means effective in one position of said accelerator pedal to position said switch controlled valve to connect the pressure responsive means associated with said second valve to exhaust irrespective of the position of said switch.

17. In a vehicle transmission, a power shaft, a load shaft, a first clutch operable to connect said power shaft to said load shaft through one torque path, a second clutch operable to connect said power shaft to said load shaft through a second torque path, a first fluid pressure responsive servo for actuating said first clutch, a second fluid pressure responsive servo for actuating said second clutch, a fluid pressure source, valve means including first and second valves for controlling the admission of fluid pressure from said source to said servos, respectively, means yieldably biasing said first valve to admit fluid pressure to said first servo to engage said first clutch, means yieldably biasing said second valve to connect said second servo to exhaust, fluid pressure responsive means effective to position said second valve to deliver fluid pressure to said second servo to engage said second clutch, a switch controlled valve adapted to deliver fluid pressure to said fluid pressure responsive means, a switch effective in one operative position to position said switch controlled valve to deliver fluid pressure to said fluid pressure responsive means, fluid pressure responsive means responsive to fluid pressure delivered to said second clutch for positioning said first valve to connect said first servo to exhaust, accelerator pedal controlled means for positioning said switch controlled valve to connect the pressure responsive means associated with said second valve to exhaust irrespective of the position of said switch, additional fluid pressure responsive means associated with said first valve effective to position said first valve to deliver fluid pressure to said first servo to engage said first clutch irrespective of the position of said second valve, and driver operable means for selectively delivering fluid pressure to said last-mentioned fluid pressure responsive means.

18. In a vehicle transmission, a power shaft, a load shaft, a first clutch operable to connect said power shaft to said load shaft through one torque path, a second clutch operable to connect said power shaft to said load shaft through another torque path, a first fluid pressure responsive servo for actuating said first clutch, a second fluid pressure responsive servo for actuating said second clutch, a fluid pressure source, valve means including first and second valves for controlling the admission of fluid pressure from said source to said servos, respectively, means yieldably biasing said first valve to direct fluid pressure to said first servo to engage said first clutch, means yieldably biasing said second valve to connect said second servo to exhaust, fluid pressure responsive means effective to position said second valve to deliver fluid pressure to said second servo to apply said second clutch, an electrically controlled valve adapted to deliver fluid pressure to said fluid pressure responsive means, a switch effective in one operative position to position said electrically controlled valve to deliver fluid pressure to said fluid pressure responsive means, an accelerator pedal controlled switch effective in one position of said accelerator pedal to render said governor unable to position said electrically controlled valve in its last-mentioned position irrespective of the position of said first-mentioned switch, fluid pressure responsive means responsive to fluid pressure delivered to said second clutch servo for positioning said first valve to connect said first servo to exhaust, additional fluid pressure responsive means operable to position said first valve to deliver fluid pressure to said first servo irrespective of the position of said second valve, an electrically controlled valve for controlling the admission of fluid pressure to said last-mentioned fluid pressure responsive means, and a driver operable switch for controlling said last-mentioned valve.

19. In a vehicle transmission having a power input shaft, an intermediate shaft, clutch means including first and second clutches for connecting said input shaft to said intermediate shaft through different torque paths, a power delivery shaft, planetary gearing for connecting said power delivery shaft to said intermediate shaft at selected drive ratios including forward and reverse, a fluid pressure source, a manually operable drive range selector valve for selecting forward drive operation and reverse, blocking means for preventing movement of said drive range selector valve to its reverse position, vehicle brake pedal operated means for releasing said blocking means to permit shift to reverse, a first fluid pressure responsive servo for engaging said first clutch, a second fluid pressure responsive servo for engaging said second clutch, valve means including first and second valves for controlling the admission of fluid pressure from said fluid pressure source to said first and second servos, respectively, means yieldably biasing said first valve to connect said first servo to said fluid pressure source, means yieldably biasing said second valve to connect said second servo to exhaust, fluid pressure responsive means for positioning said second valve to deliver fluid pressure to said second clutch servo, a third valve effective in one operative position to deliver fluid pressure to said fluid pressure responsive means, and fluid pressure responsive means responsive to fluid pressure delivered to said second servo by said second valve for positioning said first valve to connect said first servo to exhaust.

20. In a vehicle transmission having a power input shaft, an intermediate shaft and a power delivery shaft, clutch means for connecting said power input shaft to said intermediate shaft through different torque paths, a planetary gearing unit for connecting said intermediate shaft to said power delivery shaft at selected drive ratios including forward and reverse, a fluid pressure source, a driver operable drive range selector valve for selecting forward and reverse drive operation, blocking means for preventing movement of said drive range selector valve to its reverse position comprising a piston member spring biased to prevent movement of said valve to its reverse position, means for releasing said blocking means comprising a vehicle brake pedal controlled valve adapted to deliver air pressure to said piston to move said piston against said spring when the vehicle brakes are applied, a source of air pressure connected to said brake pedal actuated valve, a first servo for engaging one of said clutches, a second servo for engaging the other of said clutches, valve means for controlling the admission of pressure from said fluid pressure source to said servos including a first valve for controlling said first servo and a second valve for controlling said second servo, means yieldably biasing said first valve to connect said first servo to said fluid pressure source, means yieldably biasing said second valve to connect said second servo to exhaust, means for positioning said second valve to connect said second servo to said fluid pressure source, means responsive to fluid pressure delivered to said second servo for positioning said first valve to connect said first servo to exhaust, and manually operable means for positioning said first valve to direct fluid pressure to said first servo irrespective of the position of said second valve.

21. In combination in a transmission, an engine driven shaft, an intermediate shaft, a final power output shaft, torque transmitting means operably connecting said intermediate shaft to said final power output shaft, a clutch drum rotatably driven by said engine driven shaft, said clutch drum having a member thereof positioned radially with respect to the axis of rotation of said drum and having axially extending servo chambers at opposite sides thereof, said clutch drum providing an enclosure, a drive connection for connecting said intermediate shaft to said clutch drum through one torque path including a first clutch disposed in said enclosure, a drive connection for connecting said intermediate shaft to said clutch drum through a second torque path including a second clutch disposed in said enclosure, a piston for actuating one of said clutches positioned within said enclosure and supported upon said drum member, a piston for actuating the other of said clutches supported upon said drum member externally of said enclosure, actuating means operatively connecting said last-mentioned piston to said other clutch, said intermediate shaft constituting the sole drive connection between said clutch drum and said torque transmitting means irrespective of which clutch is engaged, a fluid pressure source, and valve means for controlling the admission of fluid pressure from said source to said servo chambers to control the engagement of said clutches.

References Cited in the file of this patent

UNITED STATES PATENTS 2,712,373     Smirl  ---------------- July 5, 1955